3,005,007
PREPARATION OF ORGANOPHOSPHORUS COMPOUNDS FROM GLYCEROL AND PHOSPHORUS OXYHALIDES

William L. Fierce, Crystal Lake, and Walter J. Sandner, Carpentersville, Ill., assignors to The Pure Oil Company, Chicago, Ill., a corporation of Ohio
No Drawing. Filed Jan. 19, 1959, Ser. No. 787,357
9 Claims. (Cl. 260—461)

This invention relates to new and useful improvements in processes for the preparation of organophosphorus compounds and to certain novel organophosphorus compounds which are useful as hydraulic fluids, synthetic lubricants, organic intermediates, etc.

In recent years, organophosphorus compounds have been extensively investigated. Organic phosphate esters have been extensively used as synthetic lubricants and hydraulic fluids because of superior properties in certain specialized applications. For example, the phosphate esters are less flammable and less volatile than hydrocarbon fluids and have better lubricating properties. The thermal and hydrolytic stability of phosphate esters is about the same as that of petroleum hydrocarbons but the viscosity index is only fair in comparison with petroleum hydrocarbons. The simple trialkyl phosphates have been prepared by a variety of processes, which are discussed in Organophosphorus Compounds, Kosolapoff, John Wiley and Sons Inc., 1950, chapter 9, such as the reaction of phosphorus pentoxide or concentrated phosphoric acid with alcohols, or the reaction of alcohols with phosphorus oxychloride in the presence of a tertiary nitrogen base. The preparation of phosphate esters of polyhydroxy organic compounds, such as glycols and polyoxyglycols, has presented a number of problems which are not solved satisfactorily by any preparatory techniques taught by the published prior art. When alkylene glycols or polyoxyalkylene glycols are reacted with phosphorus compounds, such as phosphoric acid, phosphorus pentoxide, or phosphorus oxychloride, a number of competing reactions are involved. Firstly, there is the possibility of reaction with both ends of the glycol or polyglycol molecule with the formation of a heterocyclic ester. Second, there is the possibility of reaction with opposite ends of the glycol or polyglycol molecule by different phosphorus-containing reagents to form diphosphate or polyphosphate esters. In addition, there are problems presented by the order of addition of reactants and the reaction temperatures used, since a number of different products are obtained by varying these reaction conditions. Solutions to certain of these problems are proposed in our proir copending applications, Serial No. 689,055, filed October 9, 1957, Serial No. 729,231, filed April 18, 1958, and Serial No. 754,727, filed August 13, 1958. Glycerol and other highly polar polyhydroxy organic compounds, however, do not react with phosphorus oxychloride or its derivatives in the same manner as do the alcohols and glycols. Glycerol by itself is completely unreactive toward phosphorus oxychloride. Glycerol is insoluble in ether and other common non-polar solvents but is soluble in polar solvents, such as water and certain alcohols. However, polar solvents such as water and alcohols also react with the phosphorus oxychloride and thus are not satisfactory reaction media for effecting the reaction of glycerol or other polar polyhydroxy organic compounds with phosphorus oxychloride.

It is therefore one object of this invention to provide a new and improved process for the preparation of organophosphorus compounds from polyhydroxy organic compounds.

Another object of this invention is to provide an improved class of phosphorus-containing synthetic lubricants and hydraulic fluids.

A feature of this invention is the provision of an improved process for the preparation of liquid organophosphorus compounds by reaction of highly polar polyhydroxy organic compounds, containing at least three hydroxy radicals per molecule, with a phosphorus oxyhalide, an alkoxy or aryloxy phosphoryl dichloride, or a dialkoxy or diaryloxy phosphoryl chloride in solution in dimethylformamide.

Another feature of this invention is the provision of an improved class of organophosphorus compounds produced by reaction of polyhydroxy organic compounds, such as glycerol, erythritol, mannitol, monosaccharides, pyrogallol, or phloroglucinol, with phosphorus oxyhalides or mono- or dialkoxy- or aryloxy-substituted derivatives thereof, in dimethylformamide, which compounds are liquid and have satisfactory properties for use as hydraulic fluids or synthetic lubricants.

Other objects and features of this invention will become apparent from time to time throughout the specification and claims as hereinafter related.

This invention is based upon our discovery that novel organophosphorus compounds may be prepared by reacting polar polyhydroxy organic compounds (containing three or more hydroxy radicals per molecule), such as glycerol, erythritol, mannitol, monosaccharides, pyrogallol, and phloroglucinol with a phosphorus oxyhalide or derivative thereof in which one or two of the halogen atoms is replaced by an alkoxy or aryloxy radical, in solution in dimethylformamide. The preferred phosphorus-containing reactants have the general formula: $(RO)_nP(O)X_{3-n}$, where $n$ is 0, 1, or 2, X is halogen (e.g., Cl, Br, or I), and R is alkyl or aryl, preferably containing from one to thirty carbon atoms per radical. The reaction conditions are not critical with respect to either temperature or pressure, except that it is preferred that temperatures and pressures be used which will maintain a liquidus system. The reaction will take place at temperatures as low as $-20°$ C. and as high as $50°$ C. and higher. The reaction proceeds satisfactorily at atmospheric pressure and will take place under superatmospheric pressure or moderate subatmospheric pressures. The by-product hydrogen halide is preferably stripped from the reaction mixture, although it may be removed be reaction with a tertiary base such as pyridine or dimethylaniline. The following examples are illustrative of the scope of this invention.

EXAMPLE I

A 1-liter, 3-necked flask, fitted with a thermometer, dropping funnel, stirrer, and ice-water bath, was charged with 76.7 g. (0.833 mol) glycerol and 150 ml. dimethylformamide. The mixture was stirred and cooled to 5° C. From the dropping funnel, 128 g. (0.833 mol) of $POCl_3$ was added to the reaction mixture with stirring. The addition time was about 2½ hours and the temperature rose to about 50° C. The mixture was stirred and allowed to cool to room temperature. This mixture was then stripped free of absorbed HCl and dimethylformamide by water-aspirator vacuum. The temperature was held below about 40° C. by the ice-water bath. The material remaining was a clear, pale yellow, viscous liquid weighing 155.8 g. This material contained 14.8% w. phosphorus, had a pour point of 20.5° C., and a viscosity index of 93. This product was substantially insoluble in non-polar solvents, such as ether, and was soluble in polar solvents, such as water or alcohol. This product was slightly acidic when dissolved in water. However, the acidity may be neutralized by adding alkali to the aqueous solution and then removing the water, or by reaction with an ion-exchange resin. This material is useful as a high-temperature lubricant or hydraulic fluid, and may be substituted for petroleum lubricants and hydraulic fluids for use at elevated temperatures.

EXAMPLE II

Another experiment was carried out using the same apparatus and reactants as in Example I, but using a substantial excess of glycerol. In this experiment, 5 parts by weight of glycerol were reacted with 2 parts by weight of phosphorus oxychloride in solution in dimethylformamide. After reaction was complete and by-product hydrogen chloride and the solvent, dimethylformamide, were stripped from the mixture, there was obtained a thin liquid product. This product containing 5.3% w. phosphorus, and had a pour point of −40° C. and a viscosity index of 60. This product was substantially insoluble in non-polar solvents and was soluble in polar solvents such as water or alcohol. This product was slightly acidic when dissolved in water. However, the acidity may be neutralized by adding alkali to the aqueous solution and then removing the water, or by reaction with an ion-exchange resin.

EXAMPLE III

In still another experiment, using the same apparatus as Examples I and II, 4 parts by weight of glycerol were reacted with 1 part by weight of 2-ethylhexylphosphoryl dichloride in solution in dimethylformamide. After reaction was complete and by-product HCl and the solvent, dimethylformamide, were stripped away, there was obtained a liquid product which was soluble in ether and partly soluble in water. This product contained 7.7% w. of phosphorus, and had a pour point of −55° C. and a viscosity index of 96. This liquid product is useful as a synthetic lubricant or hydraulic fluid, particularly for high-temperature applications.

EXAMPLE IV

When phosphorus oxyhalides, or derivatives thereof, are reacted with polyhydroxy polar organic compounds, using the same apparatus and reaction conditions as in Examples I to III, in dimethylformamide as solvent, there are obtained a variety of organophosphorus compounds. Most of these organophosphorus compounds are liquid and are useful as synthetic lubricants or hydraulic fluids. Solid products are useful as coatings. In Table I, there are set forth a number of different polyhydroxy organic phosphorus compounds which are reacted with phosphorus oxyhalides (or derivatives thereof) to produce novel organophosphorus compounds.

*Table I*

REACTION OF POLYHYDROXYORGANIC COMPOUNDS WITH $POX_3$ (AND ITS DERIVATIVES) IN DIMETHYLFORMAMIDE

| Example No. | Polyhydroxy organic compound (A) | Phosphorus compound (B) | Mol Ratio, A/B | Product |
|---|---|---|---|---|
| 1 | glycerol | $POCl_3$ | 1 | viscous liquid. |
| 2 | do | $POCl_3$ | 4.1 | liquid. |
| 3 | do | $C_2H_5C_8H_{12}OPOCl_2$ | 10 | Do. |
| 4 | do | $POBr_3$ | 4 | Do. |
| 5 | erythritol | $POCl_3$ | 2 | viscous liquid. |
| 6 | do | $(C_2H_5C_6H_{12}O)_2POCl$ | 0.25 | solid. |
| 7 | xylitol | $CH_3OPOCl_2$ | 10 | liquid. |
| 8 | mannitol | $POCl_3$ | 5 | Do. |
| 9 | pyrogallol | $POCl_3$ | 2 | solid. |
| 10 | phloroglucinol | $POCl_3$ | 0.33 | Do. |
| 11 | glycerol | $C_6H_5POOCl_2$ | 4 | liquid. |
| 12 | do | $(C_6H_5O)_2POCl$ | .33 | solid. |
| 13 | glucose | $POCl_3$ | 1 | Do. |
| 14 | do | $POCl_3$ | 3 | Do. |
| 15 | glycerol | $(C_{18}H_{37}O)_2POCl$ | .33 | Do. |
| 16 | do | $C_{18}H_{37}OPOCl_2$ | 4 | liquid. |

While this invention has been described fully and completely with special emphasis upon several preferred embodiments thereof, as required by the patent statutes, we wish it understood that within the scope of the appended claims the invention may be practiced otherwise than as specifically described herein.

What is claimed is:

1. A method of preparing organophosphorus compounds which consists of reacting at least one compound of the formula: $(RO)_nP(O)X_{3-n}$, where X is halogen, R is selected from the group consisting of alkyl and aryl radicals and $n$ is an integer from 0 to 2, with glycerol in solution in dimethylformamide.

2. A method in accordance with claim 1 in which the phosphorus-containing reactant is $P(O)Cl_3$.

3. A method in accordance with claim 1 in which the phosphorus-containing reactant is $ROP(O)Cl_2$, where R is a $C_1$–$C_{30}$ alkyl radical.

4. A method in accordance with claim 1 in which the phosphorus-containing reactant is $(RO)_2P(O)Cl$, where R is a $C_1$–$C_{30}$ alkyl radical.

5. Organophosphorus compounds produced in accordance with claim 1.

6. The reaction product produced by reaction of equimolar quantities of $P(O)Cl_3$ and glycerol in solution in dimethylformamide, said product being a very viscous liquid, having a viscosity index greater than 90, a pour point of about 20° C., and containing about 14% phosphorus.

7. The reaction product produced by reaction of 5 parts by weight of glycerol with 2 parts by weight of $P(O)Cl_3$ in solution in dimethylformamide, said product being a liquid of intermediate viscosity index, having a pour point of about −40° C., and containing about 5% phosphorus.

8. The reaction product produced by reaction of 4 parts by weight of glycerol with 1 part by weight of 2-ethylhexylphosphoryl dichloride in solution in dimethylformamide, said product being a liquid having a pour point of about −54° C., a viscosity index greater than 90, and containing about 7% phosphorus.

9. A method in accordance with claim 1 in which the phosphorus-containing reactant is added to a solution of glycerol in dimethyl formamide, at a temperature of about −20° to +50° C.

References Cited in the file of this patent

UNITED STATES PATENTS 2,643,261     Matuszak et al.     June 23, 1953

FOREIGN PATENTS 711,512     Great Britain     July 7, 1954

OTHER REFERENCES

Bellairta et al.: Ricerca Sci. 22, 69–70 (1952), cited in Chemical Abstracts 48, 3881i–3889a (1954).

Schenflan-Jacons: The Handbook of Solvents, page 310 (1953), D. Van Nostrand Co., Inc., New York, N.Y.

Chem. Abs., 49, 896s (1955).

Ashton et al.: Chem. and Ind., 1955, 1183.

Hartman, Nature, 176, 1024 (1955).

Chem. Abs., 50, 1031s (1956).

Freeman et al.: J. Am. Chem. Soc., 78, 2678–2682 (1956).